(12) United States Patent
Livesley et al.

(10) Patent No.: US 12,417,577 B2
(45) Date of Patent: *Sep. 16, 2025

(54) COHERENCY GATHERING FOR RAY TRACING

(71) Applicant: Imagination Technologies Limited, Kings Langley (GB)

(72) Inventors: Michael John Livesley, Hertfordshire (GB); Gregory Clark, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/220,380

(22) Filed: Jul. 11, 2023

(65) Prior Publication Data

US 2023/0351673 A1    Nov. 2, 2023

Related U.S. Application Data

(63) Continuation of application No. 17/985,078, filed on Nov. 10, 2022, now Pat. No. 11,699,260, which is a
(Continued)

(30) Foreign Application Priority Data

Aug. 21, 2020    (GB) ...................................... 2013083

(51) Int. Cl.
　　*G06T 15/06*　　(2011.01)
　　*G06T 1/60*　　(2006.01)
　　*G06T 15/00*　　(2011.01)

(52) U.S. Cl.
　　CPC ................ *G06T 15/06* (2013.01); *G06T 1/60* (2013.01); *G06T 15/005* (2013.01); *G06T 2210/21* (2013.01)

(58) Field of Classification Search
　　None
　　See application file for complete search history.

(56) References Cited

U.S. PATENT DOCUMENTS

| 2011/0170557 A1 | 7/2011 | Aila et al. |
| 2014/0111515 A1 | 4/2014 | Peterson et al. |

(Continued)

FOREIGN PATENT DOCUMENTS

| CN | 102282591 A | 12/2011 |
| CN | 102947865 A | 2/2013 |

(Continued)

OTHER PUBLICATIONS

Barringer et al., "Dynamic Ray Stream Traversal," ACM Transactions on Graphics, vol. 33, pp. 1-9, 2014.
(Continued)

*Primary Examiner* — Robert Bader
(74) *Attorney, Agent, or Firm* — Potomac Law Group, PLLC; Vincent M DeLuca

(57) ABSTRACT

A system and method for coherency gathering for rays in a ray tracing system. The ray tracing system uses a hierarchical acceleration structure comprising a plurality of nodes including upper level nodes and lower level nodes. For each instance where one of the lower level nodes is a child of one of the upper level nodes, an instance transform is defined, specifying the relationship between a first coordinate system of the upper level node and the second coordinate system for that instance of the lower level node. The system provides an instance transform cache for storing a plurality of these instance transforms while conducting intersection testing.

20 Claims, 10 Drawing Sheets

Related U.S. Application Data continuation of application No. 17/408,801, filed on Aug. 23, 2021, now Pat. No. 11,527,036.

(56) References Cited

U.S. PATENT DOCUMENTS

| | | | |
|---|---|---|---|
| 2015/0091904 A1* | 4/2015 | Lee | G06T 15/06 345/426 |
| 2016/0260193 A1 | 9/2016 | Richards et al. | |
| 2020/0050550 A1 | 2/2020 | Muthler et al. | |
| 2020/0105046 A1 | 4/2020 | Wald et al. | |

FOREIGN PATENT DOCUMENTS

| | | |
|---|---|---|
| CN | 104200509 A | 12/2014 |
| CN | 107833267 A | 3/2018 |
| CN | 109255828 A | 1/2019 |
| CN | 109509138 A | 3/2019 |
| EP | 3435335 A1 | 1/2019 |

OTHER PUBLICATIONS

Pharr et al., "Rendering Complex Scenes with Memory-Coherent Ray Tracing," Proceedings of the 24th Annual Conference on Computer Graphics and Interactive Techniques, pp. 101-108, 1997.

Blog post, "Coherency Gathering in Ray Tracing: the Benefits of Hardware Ray Tracking," Imagination Technologies Ltd., https://www.imgtec.com/blog/coherency-gathering-in-ray-tracing-the-benefits-of-hardware-ray-tracking, Jun. 16, 2020.

Woop, "A Ray Tracing Hardware Architecture for Dynamic Scenes," Thesis for Diploma in Computer Science, Universitat des Saarlandes, Mar. 29, 2004.

* cited by examiner

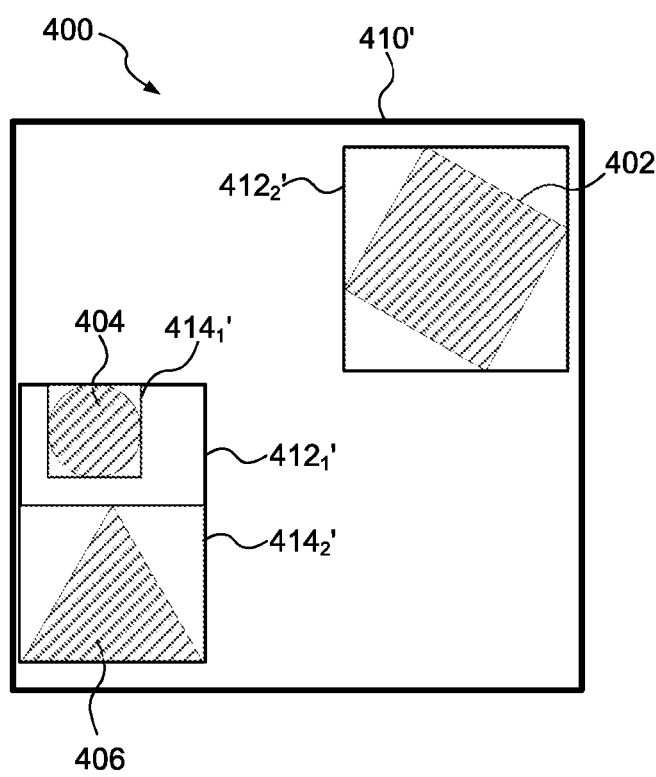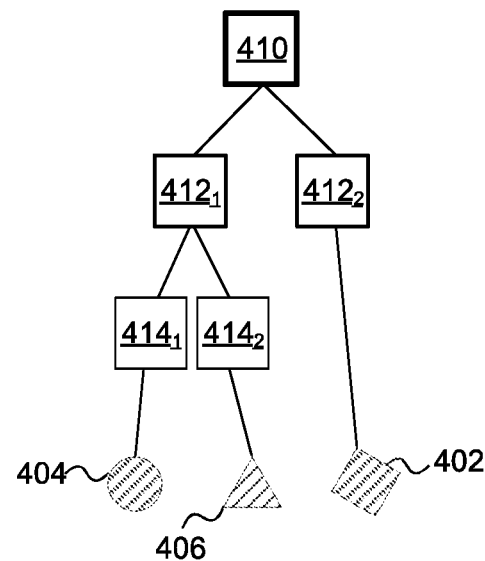
FIGURE 1a  FIGURE 1b

COHERENCY GATHERING FOR RAY TRACING

CROSS-REFERENCE TO RELATED APPLICATIONS AND CLAIM OF PRIORITY

This application is a continuation under 35 U.S.C. 120 of copending application Ser. No. 17/985,078 filed Nov. 10, 2022, now U.S. Pat. No. 11,699,260, which is a continuation of prior application Ser. No. 17/408,801 filed Aug. 23, 2021, now U.S. Pat. No. 11,527,036, which claims foreign priority under 35 U.S.C. 119 from United Kingdom Application No. 2013083.7 filed Aug. 21, 2020, the contents of which are incorporated herein by reference in their entirety.

BACKGROUND

Ray tracing systems can simulate the manner in which rays (e.g. rays of light) interact with a scene. For example, ray tracing techniques can be used in graphics rendering systems which are configured to produce images from 3-D scene descriptions. The images can be photorealistic, or achieve other objectives. For example, animated movies can be produced using 3-D rendering techniques. The description of a 3D scene typically comprises data defining geometry in the scene. This geometry data is typically defined in terms of primitives, which are often triangular primitives, but can sometimes be other shapes such as other polygons, lines or points.

Ray tracing mimics the natural interaction of light with objects in a scene, and sophisticated rendering features can naturally arise from ray tracing a 3-D scene. Ray tracing can be parallelized relatively easily on a pixel-by-pixel level because pixels generally are independent of each other. However, it is difficult to pipeline the processing involved in ray tracing because of the distributed and disparate positions and directions of travel of the rays in the 3-D scene, in situations such as ambient occlusion, reflections, caustics, and so on. Ray tracing allows for realistic images to be rendered but often requires high levels of processing power and large working memories, such that ray tracing can be difficult to implement for rendering images in real-time (e.g. for use with gaming applications), particularly on devices which may have tight constraints on silicon area, cost and power consumption, such as on mobile devices (e.g. smart phones, tablets, laptops, etc.).

At a very broad level, ray tracing involves: (i) identifying intersections between rays and geometry (e.g. primitives) in the scene, and (ii) performing some processing (e.g. by executing a shader program) in response to identifying an intersection to determine how the intersection contributes to the image being rendered. The execution of a shader program may cause further rays to be emitted into the scene. These further rays may be referred to as "secondary rays".

A lot of processing is involved in identifying intersections between rays and geometry in the scene. In a very naïve approach, every ray could be tested against every primitive in a scene and then when all of the intersection hits have been determined, the closest of the intersections could be identified. This approach is not practical to implement for scenes that may have millions or billions of primitives, where the number of rays to be processed may also be millions. Consequently, ray tracing systems typically use an acceleration structure which characterises the geometry in the scene in a manner which can reduce the work needed for intersection testing. However, even with current state of the art acceleration structures it is difficult to perform intersection testing at a rate that is suitable for rendering images in real-time (e.g. for use with gaming applications), particularly on devices which have tight constraints on silicon area, cost and power consumption, such as on mobile devices (e.g. smart phones, tablets, laptops, etc.).

Modern ray tracing architectures typically use acceleration structures based on bounding volume hierarchies—in particular, bounding box hierarchies. Primitives are grouped together into bounding boxes that enclose them. These bounding boxes are, in turn, grouped together into larger bounding boxes that enclose them. Intersection testing then becomes easier, because, if a ray misses a bounding box, there is no need to test it against any of the children of that bounding box.

In a typical hierarchical approach, two types of acceleration structure can be identified: a Bottom Level Acceleration Structure (BLAS); and a Top Level Acceleration Structure (TLAS). A BLAS groups together primitives—that is a BLAS has leaf nodes that are object-primitives (commonly triangles, although other geometric shapes are possible). The top level of the BLAS is a single root node. A BLAS can be used to describe a single object in the scene, for example. A TLAS describes the scene at a high level, starting from a root node at the top level, and terminating in BLASs at the lowest level.

Intersection testing proceeds by traversing the hierarchy. If a given ray "hits" a bounding box (node), it needs to be tested against each of the children of that bounding box (node). This continues down through the hierarchy until the ray either misses all children of a node, or hits at least one primitive. Testing a ray against a node requires retrieving from memory (i) a description of the ray (typically defined by an origin and direction) and (ii) a description of the geometry of the node (either bounding box coordinates or coordinates of the primitive).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A system and method are provided, for coherency gathering for rays in a ray tracing system. The ray tracing system uses a hierarchical acceleration structure comprising a plurality of nodes including upper level nodes and lower level nodes. For each instance where one of the lower level nodes is a child of one of the upper level nodes, an instance transform is defined, specifying the relationship between a first coordinate system of the upper level node and the second coordinate system for that instance of the lower level node. The system provides an instance transform cache for storing a plurality of these instance transforms while conducting intersection testing.

According to one aspect, there is provided a method of coherency gathering, according to claim 1.

Each lower level node can be a descendant (child, grandchild, etc.) of at least one of the upper level nodes. The lower level nodes can include root lower level nodes. A root lower level node can have a parent that is an upper level node, with all of the nodes in the hierarchy above it (i.e. its ancestor nodes such as grandparent nodes) being upper level nodes. The root lower level node can have at least one child that is a lower level node, with all of the nodes in the hierarchy below it being lower level nodes.

There may be at least one root lower level node that is a descendant (e.g. grandchild) of two or more upper level nodes. That is, the root lower level node may be instantiated twice (or more) by two (or more) different upper level nodes. Alternatively or in addition, there may be at least one root lower level node that is instantiated twice (or more) by a single upper level node.

The first coordinate system may be a global coordinate system (also known as "world space"). The second coordinate system may be a local coordinate system associated with a BLAS. The geometry information of all descendant nodes of a given root lower level node may be defined in the same local coordinate system.

The method may further comprise, before the step of submitting the selected group of rays for intersection testing, retrieving the geometry information of the selected lower level node. The method may further comprise retrieving the ray information of the selected group of rays. Retrieving the geometry information may comprise retrieving it from the memory. Retrieving the ray information may comprise retrieving it from the ray store. Retrieving the instance transform may comprise retrieving it from the memory. Submitting the selected group may comprise transforming the ray information using the instance transform.

The instance transform may be defined for a root lower level node and all descendant nodes of the root lower level node. A root lower level node, together with its descendants, may form a BLAS, and may represent a model of an object. The object will typically be a rigid object, such that the instance transform applies identically to all parts of the object.

The ray information defining each ray may comprise a position and direction in the global coordinate system. The direction is the direction of the ray. The position may be the origin of the ray. The ray information may further comprise a minimum path length and a maximum path length of the ray.

The geometry information of each upper level node may comprise a bounding volume, such as a bounding box—for example, an axis aligned bounding box. The bounding volume (or bounding box) may be a volume that encloses the volumes of all of the child nodes of the node in question. The geometry information of each lower level node may comprise a bounding volume (similarly to an upper level node) or it may comprise a description of one or more geometric primitives. The primitives may be geometric shapes, such as triangles.

When the instance transform is not found in the instance transform cache, retrieving the instance transform may comprise: requesting (724) the instance transform; monitoring whether the instance transform has been returned; and after detecting that the instance transform has been returned, proceeding to submit the selected group of rays for intersection testing.

Requesting the instance transform may comprise requesting it from the memory (optionally through the acceleration structure cache). The request may be satisfied when the requested instance transform is returned (from the memory, optionally via the acceleration structure cache).

The method may proceed to request a second instance transform while waiting for a request for the first instance transform to be satisfied. Requests may be satisfied (that is, instance transforms may be returned) in a different order from the order in which they were requested. For example, the method may comprise requesting a first instance transform, followed by requesting a second instance transform; monitoring whether these instance transforms have been returned; detecting that the second instance transform has been returned; submitting the group of rays associated with the second instance transform for intersection testing; subsequently detecting that the first instance transform has been returned; and submitting the group of rays associated with the first instance transform for intersection testing.

Also provided is a method of intersection testing comprising the method of coherency gathering above, the method further comprising intersection testing each of the rays of the selected group of rays against said instance of said lower level node.

Also provided is a ray tracing method comprising the method of intersection testing and further comprising calling a shader program to calculate the effect of an intersection between a ray and a (primitive) node.

According to another aspect, there is provided a system for coherency gathering for rays in a ray tracing system, according to claim 7.

The coherency gathering unit may be configured to retrieve the geometry information of the lower level node selected to be tested. The system may further comprise a scheduler unit, configured to retrieve the ray information of the selected group of rays from the ray store. The system may be implemented in fixed function circuitry.

The system may further comprise an instance transform unit, configured to transform ray information using an instance transform, and wherein the coherency gathering unit is configured to, when submitting the selected group of rays for intersection testing, submit the rays and the associated instance transform to the instance transform unit.

If the system further comprises a scheduler unit, the instance transform unit may be a component of the scheduler unit.

When the instance transform is not found in the instance transform cache, the coherency gathering unit may be configured to retrieve the instance transform by: requesting the instance transform; monitoring whether the instance transform has been returned; and after detecting that the instance transform has been returned, proceeding to submit the selected group of rays for intersection testing.

The coherency gathering unit may be configured to submit the selected group of rays to the scheduler unit (see below) for intersection testing.

The system may further comprise one or more tester units, configured to perform intersection testing.

The nodes in the acceleration structure may include primitive nodes and bounding box nodes. The tester units may comprise: one or more box tester units for intersection testing bounding box nodes; and one or more primitive tester units for intersection testing primitive nodes.

The instance transform cache may comprise a content addressable memory, hereinafter CAM, and a random access memory, hereinafter RAM.

The CAM may be a component of the coherency gathering unit. The system may further comprise a scheduler unit, wherein the RAM and optionally the instance transform unit are components of the scheduler unit.

The CAM may be configured to store, for each instance transform, a reference counter that records the number of groups of rays currently being tested that reference that instance transform.

The coherency gathering unit may be configured to increment the reference counter when a node (and associated group of rays) that uses the corresponding instance transform is submitted for intersection testing. It may be configured to decrement the reference counter when intersection testing is completed for a node (and group of rays) that used the instance transform.

The CAM may be configured to store, for each instance transform in the instance transform cache, a validity flag that indicates whether that instance transform is currently valid.

The ray store and the memory may be provided in separate hardware units. The ray store may be local to the coherency gathering unit. The memory may be external to the coherency gathering unit. (It may also be external to the scheduler unit and the one or more tester units.) The acceleration structure cache may act as an intermediary between the coherency gathering unit and the memory.

The coherency gathering unit may be configured, when storing an instance transform in the instance transform cache, to store the instance transform in an index location whose validity flag indicates that it is not currently valid. If the validity flags indicate that all of the index locations are currently valid, the coherency gathering unit may be configured to store the instance transform in an index location for which the reference counter indicates that the instance transform is not referenced by any group of rays currently being tested.

Also provided is a graphics processing system configured to perform a method as summarized above.

Also provided is a graphics processing system comprising a system for coherency gathering as summarized above.

The coherency gathering system, ray tracing system, or graphics processing system may be embodied in hardware on an integrated circuit.

According to another aspect, there is provided a method of manufacturing, using an integrated circuit manufacturing system, a system or a graphics processing system as summarized above.

Also provided is a method of manufacturing, using an integrated circuit manufacturing system, a coherency gathering system, ray tracing system, or graphics processing system as summarised above, the method comprising: processing, using a layout processing system, a computer readable description of the coherency gathering system, ray tracing system, or graphics processing system so as to generate a circuit layout description of an integrated circuit embodying the coherency gathering system, ray tracing system, or graphics processing system; and manufacturing, using an integrated circuit generation system, the coherency gathering system, ray tracing system, or graphics processing system according to the circuit layout description.

Also provided is computer readable code configured to cause a method as summarized above to be performed when the code is run; and a computer readable storage medium having encoded thereon the computer readable code. The storage medium is a non-transitory computer readable storage medium. When executed at a computer system, the computer readable code may cause the computer system to perform any of the methods described herein.

Also provided is a non-transitory computer readable storage medium having encoded thereon an integrated circuit definition dataset that, when processed in an integrated circuit manufacturing system, configures the integrated circuit manufacturing system to manufacture a graphics processing system as summarized above.

Also provided is a non-transitory computer readable storage medium having stored thereon a computer readable description of a coherency gathering system, ray tracing system, or graphics processing system as summarised above that, when processed in an integrated circuit manufacturing system, causes the integrated circuit manufacturing system to manufacture an integrated circuit embodying the coherency gathering system, ray tracing system, or graphics processing system.

Also provided is a non-transitory computer readable storage medium having stored thereon a computer readable description of a coherency gathering system, ray tracing system, or graphics processing system as summarised above which, when processed in an integrated circuit manufacturing system, causes the integrated circuit manufacturing system to: process, using a layout processing system, the computer readable description of the coherency gathering system, ray tracing system, or graphics processing system so as to generate a circuit layout description of an integrated circuit embodying the coherency gathering system, ray tracing system, or graphics processing system; and manufacture, using an integrated circuit generation system, the coherency gathering system, ray tracing system, or graphics processing system according to the circuit layout description.

Also provided is an integrated circuit manufacturing system configured to manufacture a graphics processing system as summarized above.

The integrated circuit manufacturing system may comprise: a non-transitory computer readable storage medium having stored thereon a computer readable description of a coherency gathering system, ray tracing system, or graphics processing system as summarised above; a layout processing system configured to process the computer readable description so as to generate a circuit layout description of an integrated circuit embodying the coherency gathering system, ray tracing system, or graphics processing system; and an integrated circuit generation system configured to manufacture the coherency gathering system, ray tracing system, or graphics processing system according to the circuit layout description. The layout processing system may be configured to determine positional information for logical components of a circuit derived from the integrated circuit description so as to generate a circuit layout description of an integrated circuit embodying the coherency gathering system, ray tracing system, or graphics processing system.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIG. 1a shows a scene divided according to a bounding volume structure;

FIG. 1b represents a hierarchical acceleration structure for the bounding volume structure shown in FIG. 1a;

Figure 2:
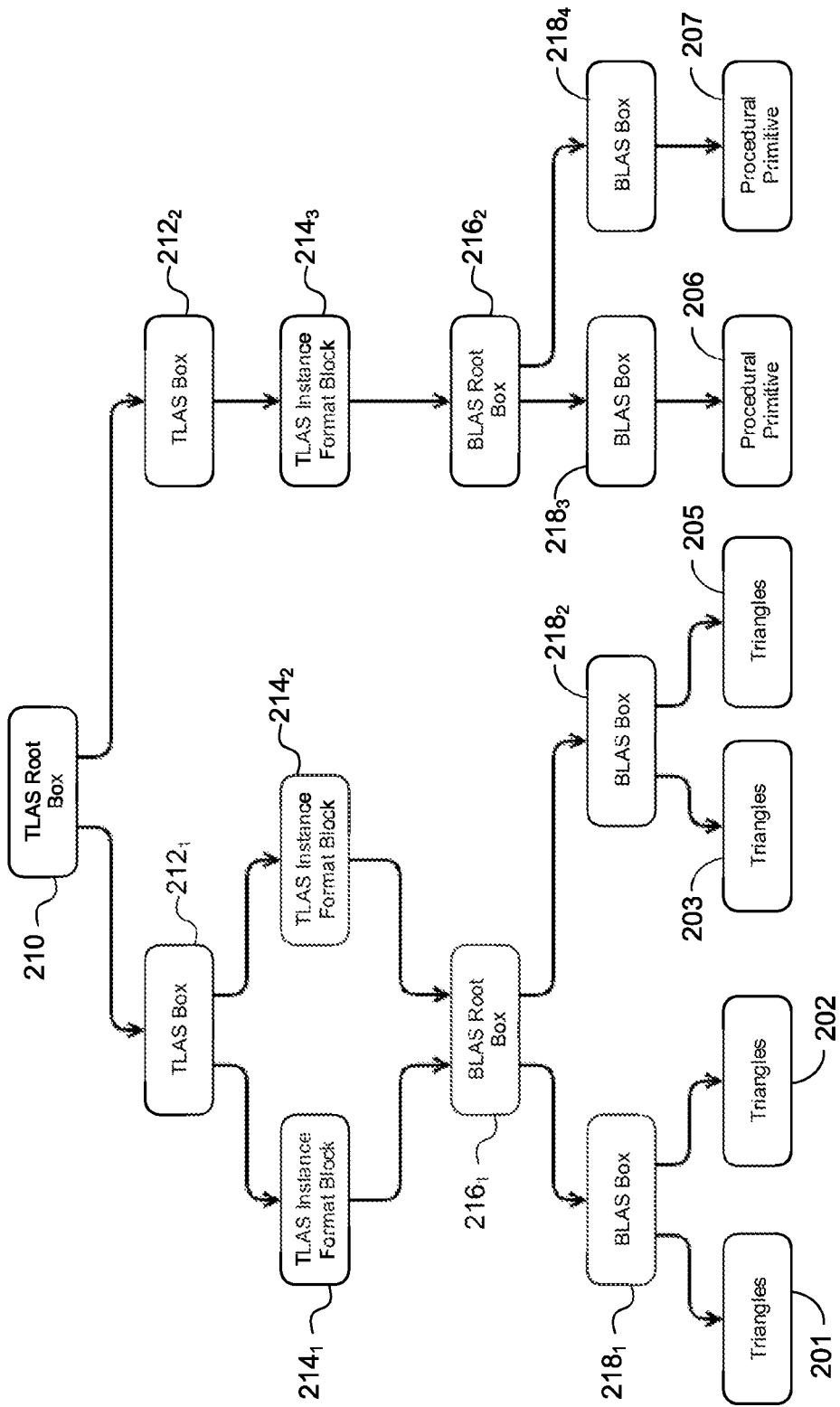
FIG. 2 shows a hierarchical acceleration structure including top level and bottom level nodes, according to an example.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

In typical hardware architectures, memory access is a relatively costly operation (in terms of time and/or energy consumption). It is desirable to minimise any redundancy in the requests to read data from memory. Consequently, it is beneficial to gather and group together rays that need to be tested against the same parts of the hierarchy. This is referred to herein as coherency gathering. It can allow geometry information to be read once, and to be tested against multiple rays. This also facilitates parallel implementation—for example, using a Single Instruction Multiple Data (SIMD) model—whereby separate hardware-units process the different rays (of the same group) in parallel against the same geometry information. Examples disclosed herein can use coherency gathering to facilitate more efficient intersection testing for ray tracing. In particular, it is desired to improve the efficiency of intersection testing of BLAS nodes.

A TLAS is defined in world-space—that is, the global coordinate-system of the scene. The global coordinate system is an example of a first coordinate system. Rays are also defined in world-space.

Because an object can occur at multiple different positions and orientations in the scene, a BLAS representing that object may be instantiated multiple times. For example, a BLAS describing a wheel of a car might be instantiated four times, once for each wheel. This BLAS might have a hierarchy of 1,000 to 10,000 nodes, for example. The wheel model is the same in each case, but each wheel is located in a different position in the scene, and the front wheels may be oriented differently from the rear wheels.

Although this could be handled by creating four separate copies of the "wheel" BLAS in memory (with the geometry information of each wheel defined in world-space), this leads to a relatively inefficient use of memory. Instead, a single copy of the model (BLAS) can be referenced multiple times ("instances") by the TLAS. Taking this latter approach, each BLAS defines its geometry information in "instance-space"—the local coordinate system of the object being described. The local coordinate system is an example of a second coordinate system. In the car example, each wheel is identical, within the local coordinate system (instance-space). The origin and axes of the local coordinate system may be defined in any convenient way. For example, the origin of the local coordinate system may be set to be the centroid of the object, or an extremity of the object. The orientation of the axes in the local coordinate system may be defined based on one or more principal axes of the object, or they may be chosen essentially arbitrarily. The object is described hierarchically within the BLAS. For example, a BLAS describing a seat may comprise nodes describing the seat bottom, the seat back, and the legs. All of the nodes in a given BLAS use the same local coordinate system.

A "world-to-instance transform" (or "instance transform" for short) defines the position and orientation of each instance of a BLAS within the scene. With this approach, the geometry information of the BLAS is stored once (in instance space) and an instance transform is stored for each instance—that is, each separate reference to the BLAS. The instance transform relates the local (instance-space) geometry information of the BLAS to world-space, for each instance of the BLAS. This has the potential to significantly reduce the storage requirements for the geometry information.

For example, a TLAS describing a car might make four references to the "wheel" BLAS (as well as many other BLASs to represent the other parts of the car). The geometry information of the bounding boxes and primitives describing the wheel is stored once. Within the TLAS, each instance of (i.e. reference to) the "wheel" BLAS is associated with a different instance transform, which positions and orients that particular wheel in world-space.

In order to test a ray against the geometry of a particular BLAS-instance, the ray needs to be transformed into instance-space for that instance. (Alternatively, the geometry information could be transformed into world-space.) The instance transform applies to all of the nodes in the BLAS; so, if a ray hits a parent node within the BLAS, the same instance transform will need to be applied again to test that ray against the child nodes of that parent node. Commonly, the transform may be provided by a controlling software application in the form of an instance-to-world transform. This can be inverted by the ray tracing system to obtain the world-to-instance transform. In the case that the rays are transformed to instance space, it is the world-to-instance transform that needs to be applied repeatedly (i.e. for every intersection test); therefore, it makes sense to store the transform in this form. If, instead, the geometry information were to be transformed to world space in order to perform the intersection testing, then it would make sense to store the instance-to-world transform.

The inventors have recognised that it would be desirable for the coherency-gathering algorithm to be able to handle BLAS-instances efficiently. Instead of gathering rays according to the BLAS nodes against which they are going to be tested, they should be gathered according to the particular instances of the BLAS nodes against which they need to be tested. In other words, the ray coherency gathering should be instance-aware. By gathering rays according to each specific instance of each BLAS node, the system can arrange for a group of rays that share the same transform as well as the same BLAS node to be scheduled for testing together. Therefore, at most one memory request should be required to retrieve the transform for intersection-testing a given group of rays. According to examples, this is further facilitated by using an instance transform cache. When an instance transform is first required, it is loaded into the instance transform cache. The next time the same instance transform is used for intersection testing, it can be expected that it can be retrieved from the instance transform cache without needing to load it from the external memory. This reduces the memory access overhead.

The later reuse of the instance transform may occur when testing other rays against the same node. Or it may occur when testing a given ray against child nodes (and grandchild nodes, etc.) within the hierarchy. As noted above, the same instance transform applies to all nodes in a given instance of a BLAS, and there may be thousands of such nodes; therefore, the instance transform may be reused many times while traversing the hierarchy of a single BLAS-instance.

Before explaining examples of the coherency gathering system in detail, it will be useful to explain examples of the acceleration structures that are used. FIGS. 1a and 1b relate to a hierarchy having a bounding volume structure. FIG. 1a illustrates a scene 400 that includes three objects 402, 404 and 406. FIG. 1b shows nodes of a hierarchical acceleration structure wherein the root node 410 represents the whole scene 400. Regions in the scene shown in FIG. 1a have references matching those of the corresponding nodes in the hierarchy shown in FIG. 1b, but the references for the regions in FIG. 1a include an additional prime symbol ('). The objects in the scene are analysed in order to build the hierarchy, and two nodes $412_1$ and $412_2$ are defined within the node 410, which bound regions containing objects. In this example, the nodes in the bounding volume hierarchy represent axis-aligned bounding boxes (AABBs) but, in other examples, the nodes could represent regions that take other forms, e.g. spheres or other simple shapes. The node $412_1$ represents a box $412_1'$ which covers the objects 404 and 406. The node $412_2$ represents a box $412_2'$ which covers the object 402. The node $412_1$ is subdivided into two nodes $414_1$ and $414_2$, which represent AABBs ($414_1'$ and $414_2'$) that respectively bound the objects 404 and 406. Methods for determining the AABBs for building nodes of a hierarchy are known in the art, and may be performed in a top-down manner (e.g. starting at the root node and working down the hierarchy), or may be performed in a bottom-up manner (e.g. starting at the leaf nodes and working up the hierarchy). In the example shown in FIGS. 1a and 1b, objects do not span more than one leaf node.

The leaf nodes of the hierarchy are object primitives. The objects in this example (a circle 404, triangle 406, and square 402) are simple geometric shapes; therefore, they can each be described using a single primitive. Objects that are more complex may be described by multiple primitives. As will be well known to those skilled in the art, triangular primitives are common in graphics applications. However, the scope of the present disclosure is not limited to triangular primitives. It will be clear from FIG. 1 that a distinction can be made between nodes that represent bounding boxes ("Box" nodes) and (leaf) nodes that represent object primitives ("Primitive" nodes).

In this context, a BLAS is formed of primitive leaf nodes and the boxes required to describe the hierarchy up to a root node. BLAS nodes are also referred to herein as "lower level nodes" and the root node of a BLAS is referred to as a "root lower level node". A TLAS references at least one BLAS, and typically gathers multiple BLAS hierarchies together for traversal. A BLAS may be referenced multiple times in the TLAS structure via different instance transforms. This allows the hierarchy builder to write the BLAS once, but reference it multiple times at different angles/locations without rewriting it, saving memory bandwidth and overhead. TLAS nodes are also referred to herein as "upper level nodes".

An example hierarchy using BLAS and TLAS structures is shown in FIG. 2. The root node (TLAS root box) 210 has two child nodes that are TLAS boxes $212_1$ and $212_2$. The TLAS box $212_1$ has two child nodes that are TLAS instance format blocks $214_1$ and $214_2$. Each instance format block defines a different world-to-instance transform. A BLAS root box $216_1$ is referenced twice, once by each of the TLAS instance format blocks $214_1$ and $214_2$. That is, there are two "instances" of the BLAS root box $216_1$. The BLAS root box $216_1$ has two child nodes that are BLAS boxes $218_1$ and $218_2$. BLAS box $218_1$ has child nodes that are primitive nodes—namely, triangles 201 and triangles 202. Similarly, box $218_2$ has primitive child nodes that are triangles 203 and triangles 205. Returning to the root node 210, its other child node, TLAS box $212_2$, has a single child that is an instance format block $214_3$. This instance format block $214_3$ references BLAS root box $216_2$. Thus, BLAS root box $216_2$ is instantiated just once. BLAS root box $216_2$ has two child nodes—BLAS boxes $218_3$ and $218_4$. These have respective children that are procedural primitives 206 and 207. Procedural primitives 206 and 207 have programmatically defined shapes, which allows for greater flexibility. For example, procedural primitives may be used where terrain or wave models can be represented mathematically and evaluated directly, avoiding the need to generate large quantities of geometric data. It will thus be understood that the geometry information of a node may comprise a bounding volume or it may comprise a description of one or more primitives.

Figure 3:
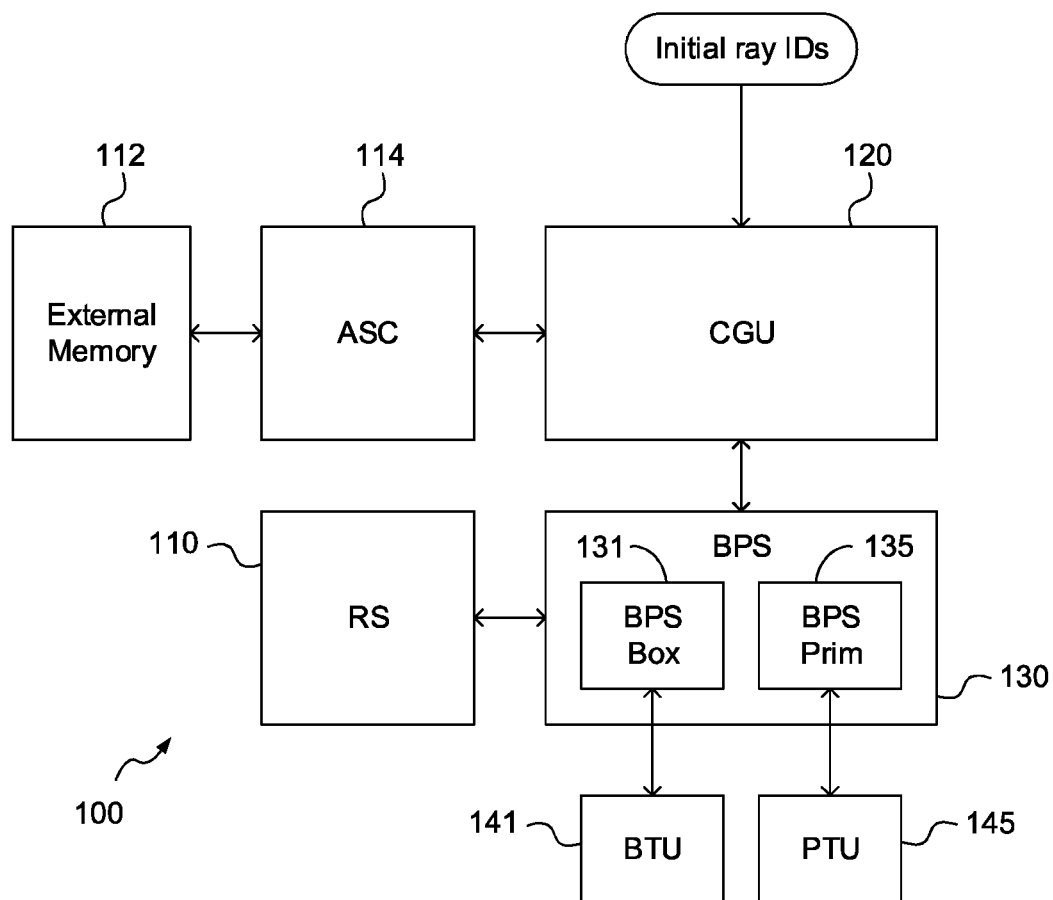
FIG. 3 is a simplified block diagram of a system for coherency gathering for rays, according to an example.

FIG. 3 illustrates a block diagram of a system 100 for coherency gathering for rays in a ray tracing system, according to an example. It will be understood that this block diagram is part of a ray tracing system, the other components of which are outside the scope of this disclosure. The system 100 comprises a Ray Store (RS) 110; and external memory 112; an Acceleration Structure Cache (ASC) 114; a Coherency Gather unit (CGU) 120; and a Box/Primitive Scheduler unit (BPS) 130. In this example, the ray store 110 is local to the ray tracing system and the memory 112 is external to the ray tracing system. For example, the memory may be on a separate semiconductor die from the ray tracing system. The ray store 110 may be on the same semiconductor die as the ray tracing system and, in particular, the rest of the components shown in FIG. 3. This makes it quicker and easier to retrieve the ray information. The BPS 130 comprises a BPS Box unit 131, for scheduling intersection testing of box nodes; and a BPS Primitive unit 135, for scheduling intersection testing of primitive nodes. The BPS Primitive unit 135 is configured to communicate with one or more primitive testing units (PTUs) 145, for intersection testing of primitive nodes. The BPS Box unit 131 is configured to communicate with one or more Box Testing Units (BTUs) 141, for box node intersection testing. The BPS 130 is configured to communicate with the ray store 110, to retrieve ray information. The CGU 120 is configured to communicate with the ASC 114, to retrieve geometry information and instance transforms, via the ASC, from the external memory 112. The ASC 114 is configured to communicate with the external memory 112. In general, the geometry information and instance transforms will comprise too large a volume of data to be stored in their entirety internally within the ray tracing system. The CGU 120 is provided with initial ray IDs, which identify rays to be tested. The ray information of these rays is stored in the ray store 110. The CGU 120 performs coherency gathering—gathering rays to be tested together against respective nodes (in particular, against given instances of BLAS nodes). Any suitable data structure may be used to associate gathered rays with their respective nodes. In this example, rays are gathered into packets. Packets contain rays to be tested against the same node.

Further, a list of packets associated with a particular node may also be maintained. A packet may contain 8 rays and is the smallest unit that may be scheduled for testing. In other examples, other packet sizes (e.g. 1, 4, 6, or 16 rays) may be used. The BPS 130 is configured to communicate with the CGU 120, in order for the BPS to schedule testing of the gathered packets of rays.

Figure 4:
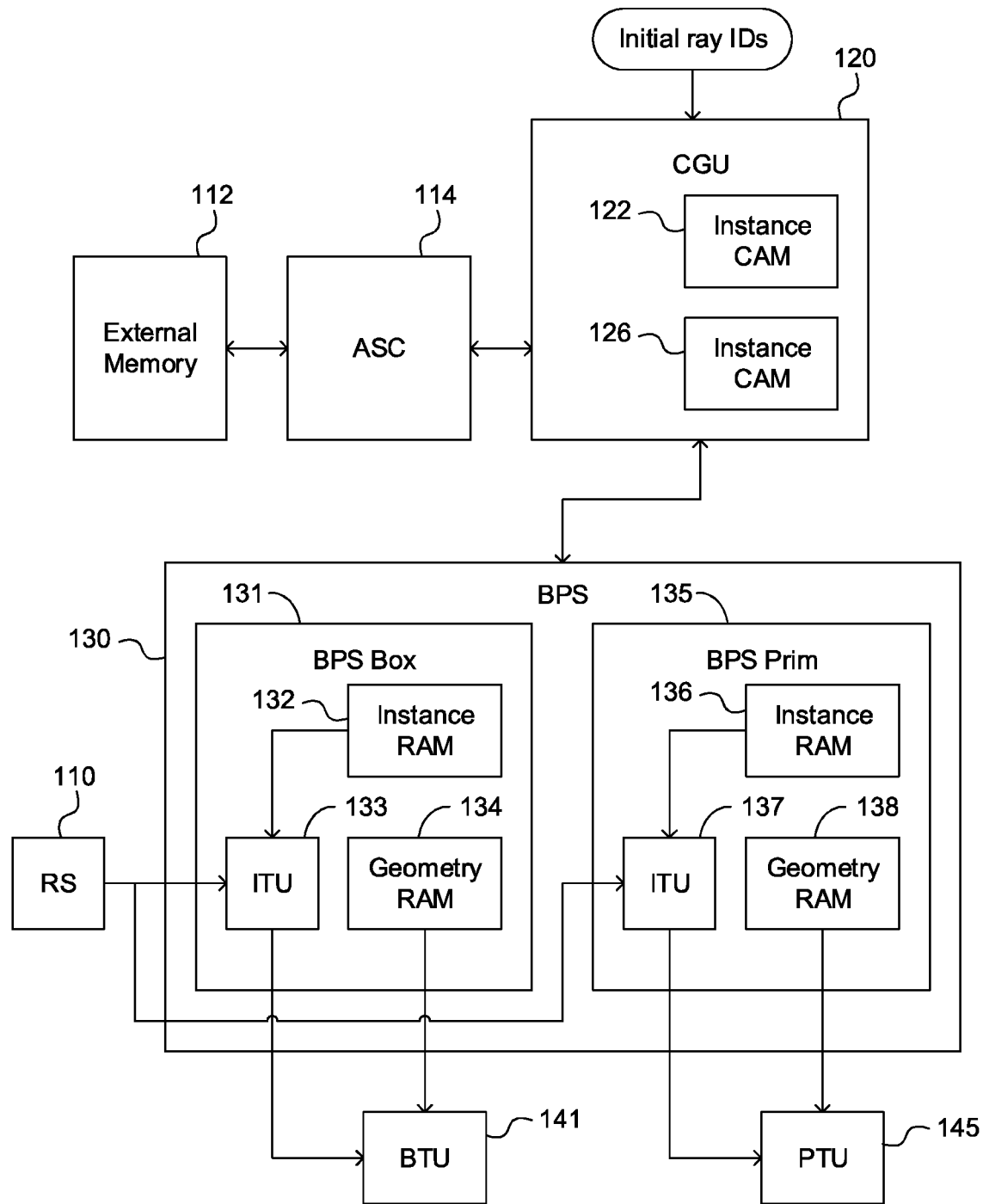
FIG. 4 shows the system of FIG. 3 in greater detail.

FIG. 4 is a more detailed version of the block diagram of FIG. 3. In particular, FIG. 4 shows the elements of the instance transform cache. The instance transform cache comprises a Content Addressable Memory (CAM), and a Random Access Memory (RAM). In the present example, the CAM is comprised in the CGU 120. It is provided in two parts—instance CAM 122 and instance CAM 126. The RAM is also provided in two parts—instance RAM 132 is comprised in the BPS box unit 131, and instance RAM 136 is comprised in the BPS primitive unit 135. The instance CAM 122 and instance RAM 132 form the instance transform cache for box nodes. The instance CAM 126 and instance RAM 136 form the instance transform cache for primitive nodes. The BPS box unit 131 further comprises an Instance Transform Unit (ITU) 133 and a geometry RAM 134. Similarly, the BPS primitive unit 135 further comprises an ITU 137 and a geometry RAM 138. Each instance RAM 132, 136 contains the transform coefficients for instance transforms currently in use for intersection testing. During intersection testing, boxes will be tested before the primitives below them in the hierarchy; therefore, it can be beneficial to cache the instance transforms for boxes and primitives separately (as is done in this example). A given instance transform will be needed earlier for box testing than it is for primitive testing. Likewise, the box testing will finish with the instance transform before the primitive testing has finished with it. Each instance CAM 122, 126 is used as an index for the respective instance RAM 132, 136. Each ITU 133, 137 receives ray information from the ray store 110 and instance transform coefficients from the respective instance RAM 132, 136. The ITU uses the transform coefficients to transform rays from world space to instance space. For box nodes, ITU 133 uses the transform coefficients from instance RAM 132 to transform the rays received from the ray store 110 to instance space. Transformed rays are provided from the ITU 133 to BTU 141. The BTU 141 also receives geometry information of the box node being intersection tested from the geometry RAM 134. For primitive nodes, ITU 137 uses the transform coefficients from instance RAM 136 to transform the rays received from the ray store 110 to instance space. The transformed rays are provided by ITU 137 to PTU 145. The PTU 145 also receives the geometry information of the primitive node being intersection tested from the geometry RAM 138. The geometry information in each geometry RAM 134, 138 is indexed by a geometry ID.

In the present example, each of the units shown in FIG. 4 is implemented in fixed function logic in hardware. This allows each unit to perform its function on an ongoing basis, while the other units also continue to perform their functions, at the same time. This permits a parallel, pipelined implementation. The system is designed to manage the flow of data through the various units in order to minimise cases where any of the units is either overloaded with work or starved of data to process.

Figure 5:
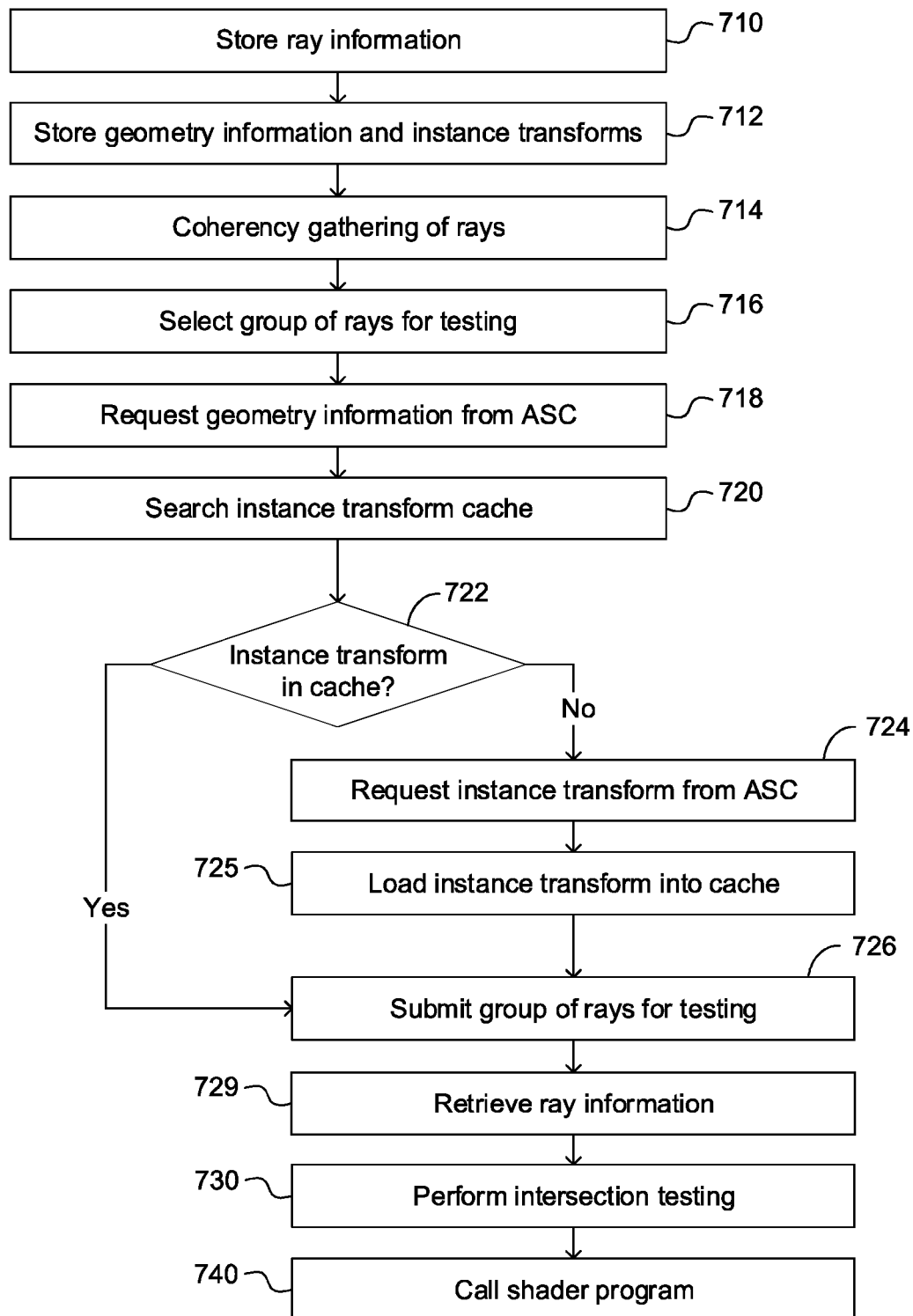
FIG. 5 is a flowchart of a method of coherency gathering, which can be implemented by the system of FIG. 3.

FIG. 5 is a flowchart illustrating a method performed by the system of FIGS. 3 and 4, according to an example. A plurality of rays is defined, each ray having associated with it ray information comprising a ray-origin and ray-direction that are defined in world space. The hierarchical acceleration structure is also defined, including a plurality of upper level (TLAS) nodes and a plurality of lower level (BLAS) nodes. Each node has geometry information associated with it. As described already above, this geometry information is defined in world space for TLAS nodes and in instance space for BLAS nodes. For each instance where one of the BLAS nodes is a child of one of the TLAS nodes, a world to instance transform is defined.

In step 710, the system stores the ray information in the (internal) ray store 110. In step 712, the system stores the geometry information and instance transforms in the external memory 112. In step 714, the CGU 120 performs coherency gathering of a plurality of rays, where each ray needs to be intersection tested against a respective node of the hierarchy. The coherency gathering can be performed by maintaining lists of rays (e.g. by forming lists, in the CGU, of accumulated packets of rays) that need to be tested against respective nodes as the rays traverse the hierarchical acceleration structure. The hierarchy can be traversed in any order. Various strategies for traversal are known in the art, and are outside the scope of this disclosure.

In step 716, the CGU 120 selects one or more of the accumulated packets of rays to form a group of rays for testing. Typically the CGU 120 will select a node and will then form a group of rays from one or more of the packets of rays associated with that node. In some cases, the CGU will form a group of rays from all of the packets (i.e. the entire list of packets) associated with the selected node. In general, both TLAS nodes and instances of BLAS nodes will be selected for testing, over time. However, for the purposes of the present example, we will assume that an instance of a BLAS node is selected. According to this example, a node is selected for intersection testing when it is "evicted" from the CGU 120. Nodes may be evicted on any of the following conditions:

When the number of rays gathered for the node exceeds a first threshold (e.g. the number of packets in the list associated with the node exceeds a threshold);

When the total number of rays in all packets maintained by the CGU exceeds a second threshold (to avoid running out of memory to store the lists, in the CGU);

When the tester units (BTU 141 and/or PTU 145) are idle, indicating that they have spare capacity to perform intersection testing (to avoid under-utilisation of computational resources).

In step 718, the CGU 120 retrieves the geometry information of the BLAS node that has been selected for testing. This involves the CGU 120 requesting the geometry information from the ASC 114. The ASC 114 is a local memory of the ray tracing system, which is used to cache geometry information and instance transforms that would otherwise need to be read from the external memory 112. When the CGU 120 requests geometry information, the ASC 114 checks whether that geometry information is already present in the cache. If it is present, the ASC provides it to the CGU 120 without needing to read it from the external memory 112. If it is not present, the ASC 114 reads it from the external memory 112, before providing it to the CGU 120. In this way, the ASC 114 acts as an intermediary between the CGU 120 and the external memory 112. Its purpose is to reduce the memory bandwidth required, by reducing the number of repeated reads from the external memory.

In step 720, the CGU 120 searches in the instance transform cache for the instance transform associated with the presently selected instance of the BLAS node. This will be described in greater detail below. However, in brief, the CGU 120 searches in the relevant instance CAM 122 or 126 for the address of the required instance transform. If the node is a box node, the CGU searches in the instance CAM 122; if the node is a primitive node, the CGU searches in the instance CAM 126. If the instance transform is already stored in the instance transform cache, the instance CAM 122 or 126 returns an index, which indicates the location of the instance transform coefficients in the respective instance RAM 132 or 136. If the instance transform is present in the cache (see step 722), the CGU proceeds to submit the selected group of rays for intersection testing (in step 726). If the required instance transform is not present in the cache, the CGU 120 retrieves the instance transform, in step 724, and loads it into the cache in step 725. In the retrieval step 724, the CGU 120 retrieves the instance transform by requesting it from the ASC 114. The ASC 114 deals with this request in essentially the same way that it deals with requests for geometry information (discussed above). If the instance transform is already present in the ASC 114, it is provided to the CGU 120 without the need to read anything from the external memory 112. If the instance transform is not present in the ASC 114, the ASC reads it from the external memory 112, before providing it to the CGU 120. In the loading step 725, the CGU 120 loads the retrieved instance transform into the instance transform cache. In particular, it stores the memory address of the instance transform in the relevant instance CAM 122 or 126, and it stores the transform coefficients of the instance transform in the respective instance RAM 132 or 136. (If the node in question is a box node, the coefficients are stored in instance RAM 132; if the node is a primitive node, the coefficients are stored in instance RAM 136.) In the present example, boxes in the BLAS are traversed first; therefore, a given transform will firstly be stored in the instance RAM 132. Later, when the first leaf (primitive) nodes are traversed, the same transform will be retrieved from the ASC 114 and loaded into the instance RAM 136, ready for primitive intersection testing.

In step 726, the CGU 120 submits the selected group of rays for intersection testing. In particular, the CGU 120 submits the group of rays to the BPS 130. To do this, the CGU 120 passes the one or more packets that comprise the selected group of rays, and the geometry information of the selected BLAS node, to the BPS 130. The geometry information is stored in the geometry RAM 134 of the BPS box unit 131 or the geometry RAM 138 of the BPS primitive unit 135, according to whether the node in question is a box node or a primitive node. In step 729, the BPS 130 requests the ray information for the selected packet or packets of rays from the ray store 110. The BPS 130 schedules the intersection testing on the tester units (BTU 141 and PTU 145). In step 730, the intersection testing is performed by the tester units (BTU 141 and PTU 145).

As seen in the discussion above, at the time that a packet of rays is submitted for testing, the CGU 120 has already ensured that the required instance transform coefficients are present in the relevant instance RAM 132/136. This means that the required coefficients are available locally with minimal latency and without the power consumption and delay involved in an external memory read operation. This can help to speed up the process of scheduling and testing the packets of rays against nodes. It can also help to avoid repeated, redundant accesses to external memory in order to read the same transform coefficients multiple times. The geometry information is also ready in the relevant geometry RAM 134, 138. Note that it is not essential for step 718 (requesting the geometry information) to be performed before step 720 (searching the instance transform cache). In some examples, the instance transform cache is searched first (step 720). If the instance transform is in the cache, then only the geometry information is retrieved; meanwhile, if the instance transform is not in the cache, then both the geometry information and the instance transform are retrieved.

In principle, it would be possible to provide a Geometry CAM to index the Geometry RAM, analogous to the use of the Instance CAMs to index the Instance RAMs. However, this has not been implemented in the present example. This is because, in a typical scene, there are many more nodes than there are instance transforms—there is one instance transform per BLAS root node, but there will typically be a large number of nodes below that root node. Given the large number of nodes, the likelihood of the geometry information of a given node still being in the geometry RAM the next time it is requested are relatively low. Therefore, the benefit of caching the geometry information in the (relatively small) geometry RAM is limited. The ASC already provides relatively fast access to geometry data.

The BPS unit schedules the intersection testing. To do this, the ITU 133, 137 takes ray information provided by the ray store 110 and transforms the rays using transform coefficients read from the instance RAM 132, 136. To perform the intersection testing (step 730), the tester units (BTU 141 and PTU 145) take transformed rays provided by the ITU 133, 137 and take node geometry read from the geometry RAM 134, 138, and test whether the transformed rays intersect the relevant node. Methods for intersection testing, as such, will be known to the skilled person and are outside the scope of this disclosure.

The results of intersection testing are returned to the BPS 130 and CGU 120. For each ray in a packet, the results indicate whether that ray intersected the BLAS node in question. Depending on the results, further processing will be carried out. If the BLAS node was a box node, and a ray intersected it, then the CGU adds the ray to the packets of rays that are being maintained by the CGU for child nodes of the intersected box node. This will mean that the ray is eventually tested against these child nodes (when the relevant packets are selected for testing, e.g. when the child node is evicted from the CGU 120). Alternatively, if the BLAS node was a primitive node, and a ray intersected it, then this fact is recorded (for example, in the ray store) and the system resumes traversal of the hierarchy. Eventually, as necessary, a shader program may be called (in step 740), to determine the effect of the intersection on the ray—for example, to determine whether the ray is reflected, refracted, absorbed, etc. by the object primitive. In the event of a reflection or refraction, for example, a new ray may be launched. In this case, ray information of this new ray would be written to the ray store 110.

The operation of the system proceeds in this way until all rays have been tested against all necessary nodes in the hierarchy.

Figure 6:
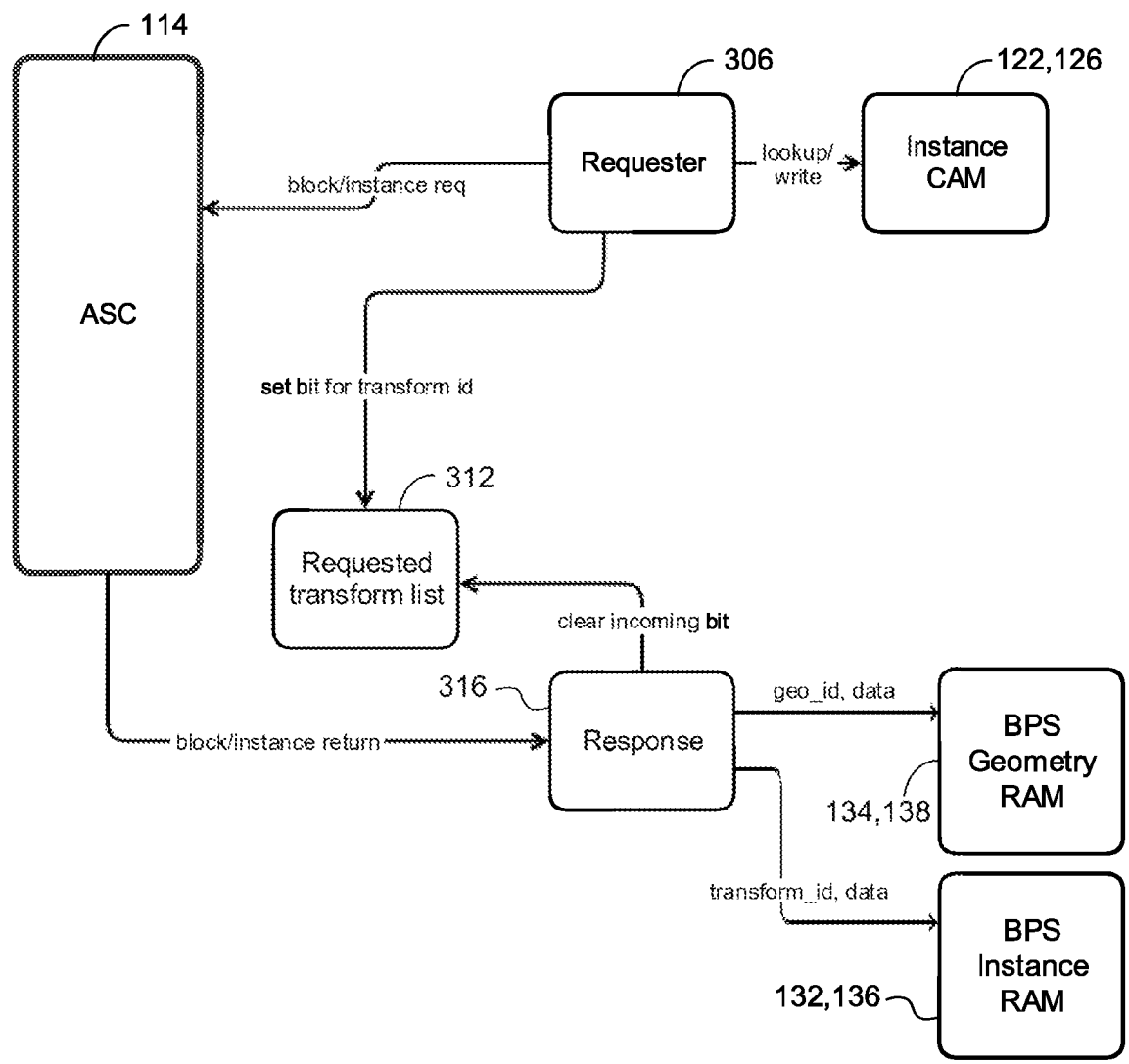
FIG. 6 is a more detailed process flowchart, illustrating a procedure for retrieving geometry information and instance transforms, according to an example.

FIG. 6 is a more detailed process flowchart explaining how geometry information and instance transforms are retrieved, according to an example.

The CGU keeps track of the current state of all nodes for which geometry information and (if necessary) instance transforms have been requested from the ASC 114. The ASC 114 may return data out of order. That is, the ASC 114 may return data in an order that is different from the order in which it was requested. This may happen, in particular, because some data is already present in the ASC, and therefore can be returned quickly, whereas other data is not currently stored in the ASC and must be retrieved from the external memory 112 before it can be returned. This other data is likely to be returned more slowly.

The information associated (directly or indirectly) with a packet of rays includes an instance address, which is the memory address of the instance transform. In the present example, the instance address is stored for each node, and thereby indirectly associated with the packet or packets that are associated with that node. Alternatively, the instance address may be stored explicitly for each packet—i.e. directly associated with the packet. The Requester module 306 examines the instance CAM 122/126 to determine if the instance address is associated with a transform ID—in other words, to determine if the instance transform is already stored in the instance transform cache. If the instance address is not associated with a transform ID (that is, the instance transform is not present in the cache), the Requester module 306 allocates a new transform ID and updates the CAM entry for this transform ID with the instance address. (If no transform ID is free for use, the system has to stall at this point and wait until one becomes available.) The Requester module 306 then makes a request to the ASC 114 for the instance transform coefficients. It sets a flag bit associated with the transform ID in the "Requested Transform List" 312. The flag bit in the Requested Transform List 312 indicates that the transform coefficients have been requested from the ASC 114 but have not yet been returned. The CGU 120 monitors the Requested Transform List 312 to detect when the instance transform coefficients have been returned. This may be done by periodically checking the Requested Transform List 312.

Sometime later, the ASC 114 returns the requested transform coefficients, which are received by the Response module 316. The Response module 316 stores the transform coefficients in the instance RAM 132/136. The Response module 316 also clears the relevant flag bit of the Requested Transform List 312. This indicates that the transform coefficients have been returned and that the intersection testing for this node and packet or packets of rays can now proceed (along with any other nodes that may have been queued that also depend on this instance transform). The Requester module 306 also requests geometry information from the ASC 114. This is returned by the ASC 114 to the Response module 316, and is then written by the Response module 316 to the geometry RAM 134/138. Another process (not illustrated) keeps track of when the geometry information has been returned.

The CGU 120 releases packets to the BPS unit 130 when the required instance transform and geometry data is available. That is, in response to detecting that the instance transform and geometry information have been returned by the ASC 114, the CGU proceeds to submit the packet or packets (and associated node) to the BPS 130 for testing. As mentioned above, this need not occur in the same order that the data was requested. By keeping track of the availability of the data, and releasing packets when the data is available (irrespective of the order in which it was requested), the system helps to maximise the utilisation of the CGU 130 and tester units 141, 145.

Figure 7A:
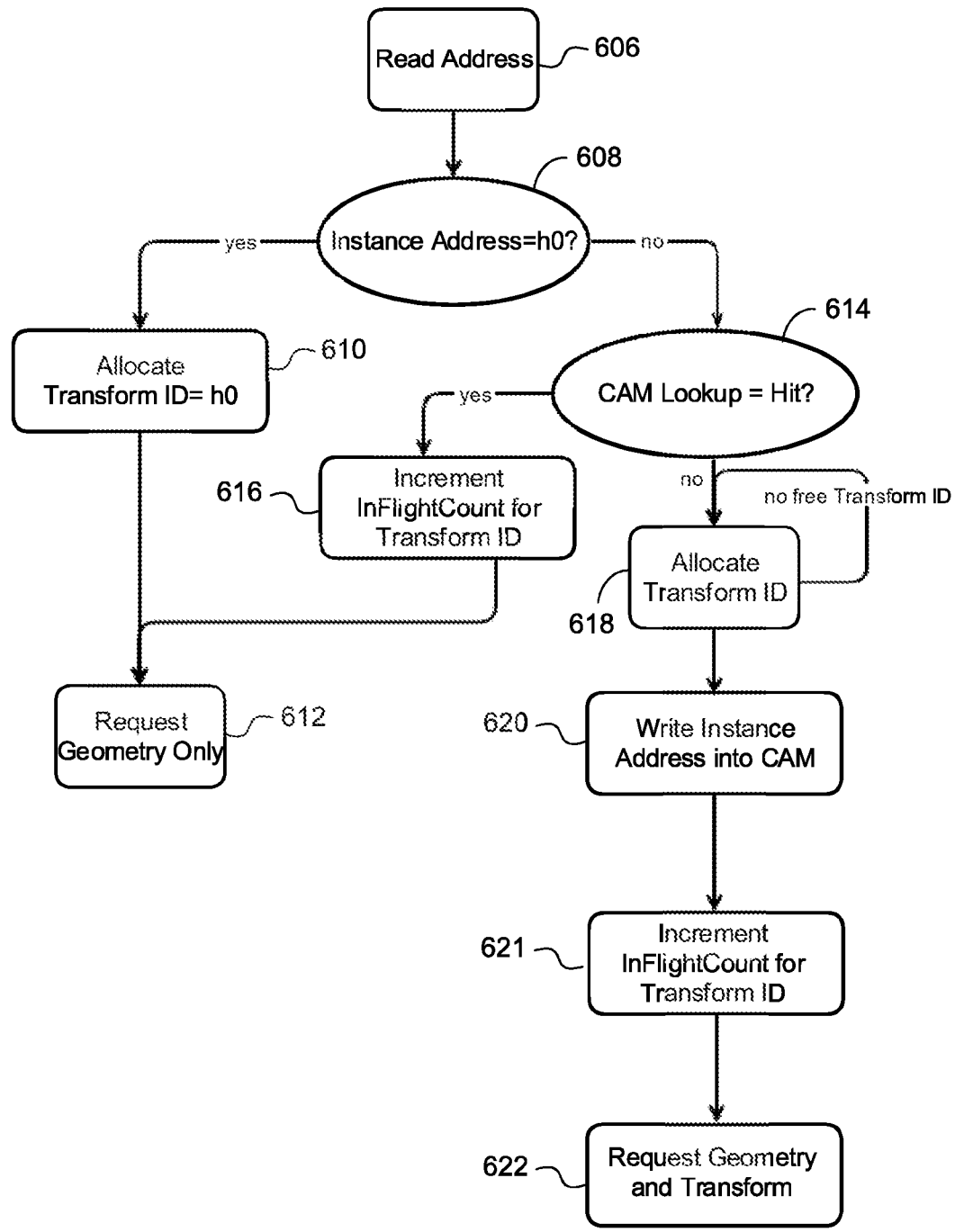
FIGS. 7a and 7b show a process flowchart illustrating the caching of instance transforms, according to an example.
Figure 7B:
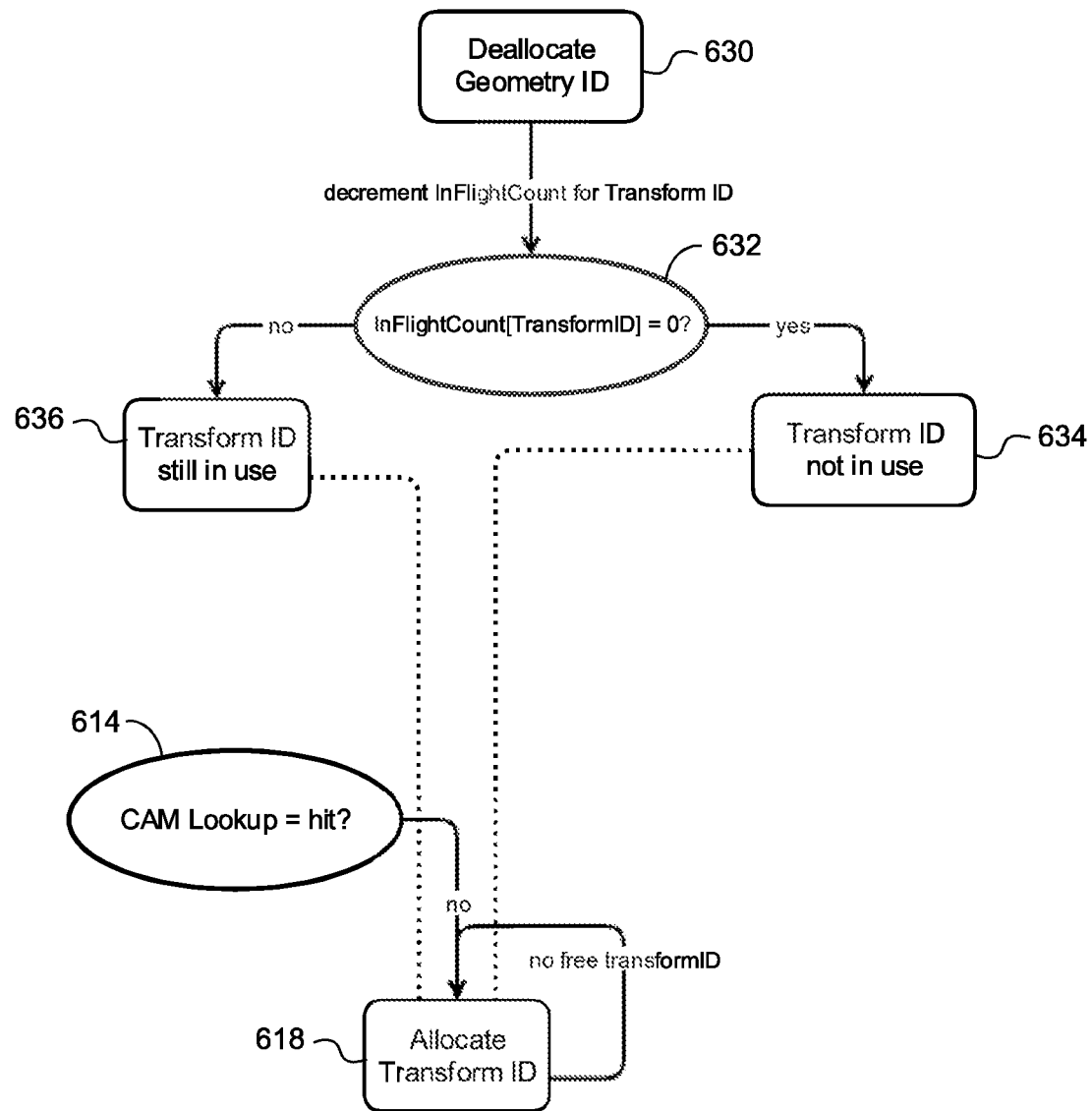
Figure 8:
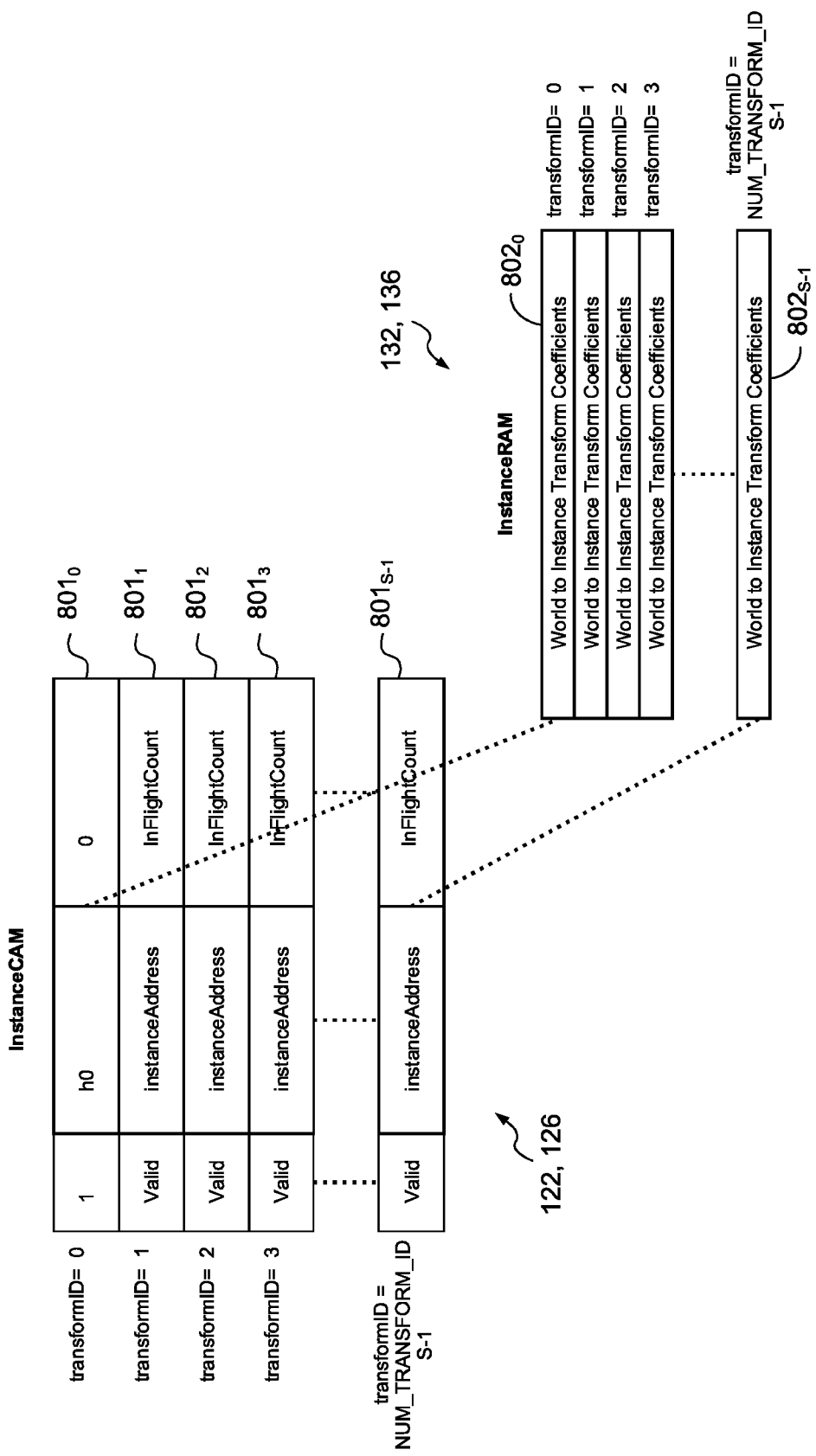
FIG. 8 shows a data structure stored in the instance transform cache, according to an example.

The process flowchart of FIGS. 7a and 7b, and the data structure shown in FIG. 8, illustrate the caching of instance transforms. In step 606, the node address and instance address are read. In step 608, the Requester module 306 checks whether the instance address is a special instance address—the address hexadecimal zero, "h0", is used as the special address in this example. The special instance address "h0" indicates that the node is a TLAS node without associated instance data; therefore, there is no need to query the instance CAM 122/126. In this case, the process proceeds to step 610, allocating a corresponding special transform ID and requesting only the geometry data from the ASC 114, in step 612. In this example, hexadecimal zero, "h0", is used as the special transform ID that is used by all TLAS nodes. The instance CAM entry for transform ID h0 always contains the instance address h0, and the transform coefficients at address h0 in the instance RAM 132/136 are always those of the identity (or null) matrix. If it is determined in step 608 that the instance address is not "h0", then the method proceeds to step 614, where the Requester module 306 examines the instance CAM 122/126, using the instance address. If there is a cache hit—that is, if the instance address is present in the instance CAM (instance CAM 122 or instance CAM 126 according to the type of node)—then the instance CAM 122 or 126 will return a transform ID that indicates the slot in the instance RAM 132/136 where the transform coefficients are stored. The method proceeds to step 616. Here, a reference counter called "InFlightCount", which is associated with the transform ID returned by the instance CAM 122/126, is incremented. This reference counter records the number of nodes that are currently "in flight" (that is, currently being intersection-tested) and rely on this instance transform. From step 616, the method proceeds to step 612, in which only the geometry data is requested from the ASC 114.

If it is determined in step 614 that the instance address is not present in the instance CAM 122/126 (that is, if there is a cache miss), then the method proceeds to step 618. Here, a new transform ID is allocated by the Requester module 306 (if a transform ID is available—if not, this node is stalled at this point). Next, in step 620, the Requester module 306 writes the instance address of the instance transform to the instance CAM 122/126, in the slot corresponding to the newly allocated transform ID. The reference counter "InFlightCount" for this transform ID is incremented (in step 621), indicating that one node (and associated packet or packets of rays) currently being tested is using this instance transform. Finally, in step 622, the Requester module 306 requests both the geometry data and the instance transform coefficients from the ASC 114.

FIG. 8 shows the data structure used in the instance CAM 122, 126 and instance RAM 132, 136, in the present example. Each instance CAM has a number of slots $801_0$-$801_{S-1}$ equal to the number S of transform IDs, and the slots are indexed by transform ID. Separate ranges of transform IDs are used in the two respective CAMs 122, 126. Each slot stores one instance address and two additional pieces of data. The first is the reference counter "InFlightCount" associated with the instance transform, and the second is a "valid" flag bit, indicating whether this transform ID is currently valid.

When the instance CAM 122, 126 is first initialised, the "valid" bit for transformID=0 is set to 1, its instance address is set to "h0", and its "InFlightCount" is set to 0. All of the other "valid" bits are set to 0, indicating that the respective transform IDs are invalid and unused. As the instance CAM 122, 126 is populated with instance addresses, the respective "valid" flag bits are set to 1, indicating that the respective transforms are valid. By maintaining a flag bit as well as a reference counter, the system is able to distinguish between slots in the instance transform cache that are (so far) empty (valid=0), and slots that contain data (valid=1), but for which the data is not currently in use (counter=0). This allows the system to preferentially allocate transform IDs corresponding to slots that have not yet been used. Only when all of the slots are "valid" will the system resort to reallocating transform IDs that are valid but are not currently in use by in-flight nodes. This helps to keep instance transforms in the instance transform cache for as long as possible, thereby increasing the likelihood of a cache hit, and consequent reduction in unnecessary access to the ASC 114 and/or external memory 112.

The instance RAM 132, 136 has the same number of slots $802_0$-$802_{S-1}$ as the respective instance CAM 122, 126 and they are similarly indexed by the transform ID. Each slot stores the transform coefficients of the world-to-instance transform associated with the respective transform ID. The entries in the CAM are organised in the same sequence as the entries in the RAM. Thus, for example, if the address of a particular instance transform is stored in the $5^{th}$ entry in the CAM (transformID=4), then the transform coefficients of that instance transform are stored in the $5^{th}$ entry (transformID=4) in the RAM.

The separation of the cache into a CAM and RAM helps to make it more efficient than a conventional cache, in this context. With a conventional associative cache, the data (i.e. the transform coefficients) would be stored in the cache itself, associated with the instance address. Upon querying the cache with the address, in the event of a cache-hit, the data would be returned by the cache, and stored in other storage, from which the tester units would access it.

By using the CAM+RAM arrangement, there is no need to query the cache when the tester is performing the intersection test. The system guarantees, via the reference counter, that all of the transform data that is needed by the testers is present in the instance transform RAM. The BPS is simply provided with the indices (transform IDs) and it can schedule testing by accessing the RAM directly without querying the CAM, and without the need for additional storage between the cache and the testers.

FIG. 7b shows the remainder of the process flowchart of FIG. 7a. When a geometry ID is deallocated in step 630, this indicates that intersection testing has been completed for a node. Accordingly, the reference counter ("InFlightCount") for the respective instance transform (identified by the transform ID) is decremented by one. This indicates that one less node (and associated packets of rays) is currently using this instance transform. In step 632, the Requester module 306 checks whether the decremented reference counter for this transform ID is now equal to zero. If so, this indicates that no in-flight nodes are using this instance transform. Consequently, the transform ID can be reallocated (in step 634) if the Requester module 306 needs to allocate a new transform ID and there are no free transform IDs. On the other hand, if it is determined in step 632 that the decremented reference counter is not equal to zero, then this indicates that the transform ID is still in use (see step 636), and cannot be reallocated yet.

When there are no free transform IDs, the Requester module 306 must wait to allocate a transform ID until one becomes available (that is, until one of the reference counters has been decremented to zero and therefore no in-flight nodes are using the respective transform ID).

Coherency gathering systems according to the present disclosure may be provided as part of a ray tracing system. The ray tracing system may comprise one or more systems for coherency gathering, one or more tester units for intersection testing, and may implement one or more shader programs. The ray tracing system may be provided as part of a graphics processing system.

It will be appreciated that scope of the present disclosure is not limited to the examples above. Various potential modifications will by now be apparent to those skilled in the art. For instance, although the example of FIG. 4 uses separate instance CAMs 122, 126 and instance RAMs 132, 136 for box nodes and primitive nodes, respectively, in other implementations, there may be just a single instance RAM and single instance CAM, which are used to store instance transforms for both box and primitive nodes. In other examples, there may be more than two CAMs and more than two RAMs.

Figure 9:
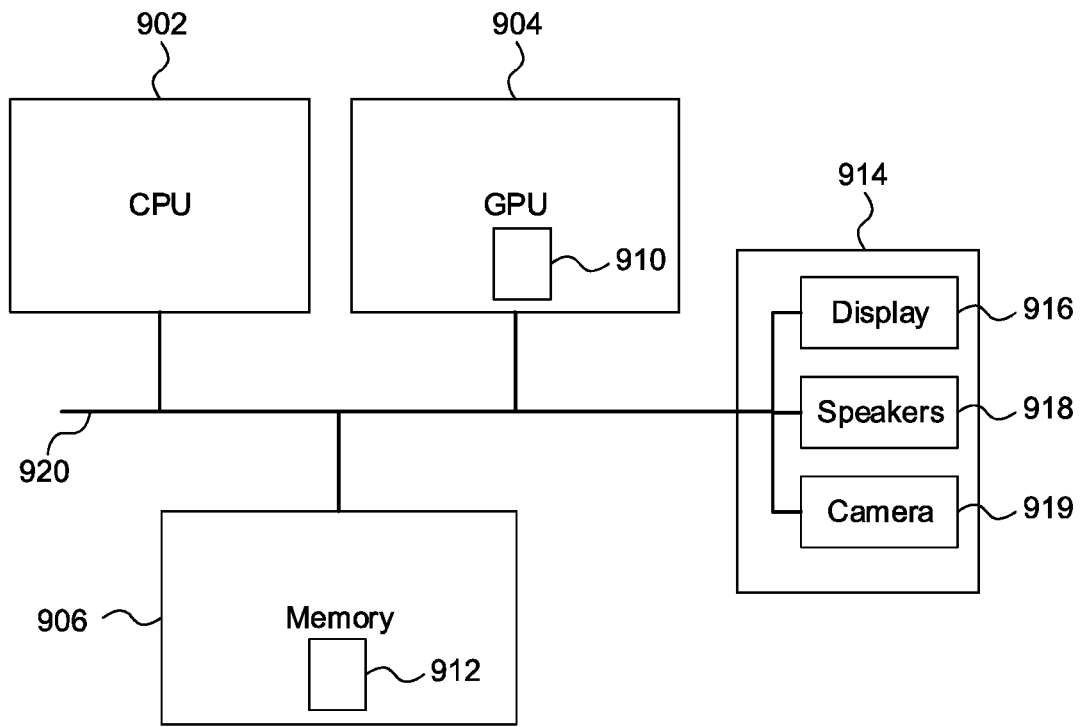
FIG. 9 shows a computer system in which a graphics processing system is implemented.

FIG. 9 shows a computer system in which such a graphics processing system may be implemented. The computer system comprises a CPU 902, a GPU 904, a memory 906 and other devices 914, such as a display 916, speakers 918 and a camera 919. A processing block 910 (corresponding to coherency gathering system 100) is implemented on the GPU 904. In other examples, the processing block 910 may be implemented on the CPU 902. The components of the computer system can communicate with each other via a communications bus 920. A store 912 (corresponding to memory 112) is implemented as part of the memory 906.

The coherency gathering system of FIGS. 3-4 was shown as comprising a number of functional blocks. This is schematic only and is not intended to define a strict division between different logic elements of such entities. Each functional block may be provided in any suitable manner. It is to be understood that intermediate values described herein as being formed by a coherency gathering system need not be physically generated by the coherency gathering system at any point and may merely represent logical values which conveniently describe the processing performed by the coherency gathering system between its input and output.

The coherency gathering systems described herein (and ray tracing systems and/or graphics processing systems incorporating them) may be embodied in hardware on an integrated circuit. The systems described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java® or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, Neural Network Accelerator (NNA), System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a coherency gathering system (or ray tracing system or graphics processing system) configured to perform any of the methods described herein, or to manufacture a coherency gathering system (or ray tracing system or graphics processing system) comprising any apparatus described herein. An integrated circuit definition dataset may be, for example, an integrated circuit description.

Therefore, there may be provided a method of manufacturing, at an integrated circuit manufacturing system, a coherency gathering system (or ray tracing system or graphics processing system) as described herein. Furthermore, there may be provided an integrated circuit definition dataset that, when processed in an integrated circuit manufacturing system, causes the method of manufacturing a coherency gathering system (or ray tracing system or graphics processing system) to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS (RTM) and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a coherency gathering system (or ray tracing system or graphics processing system) will now be described with respect to FIG. 10.

Figure 10:
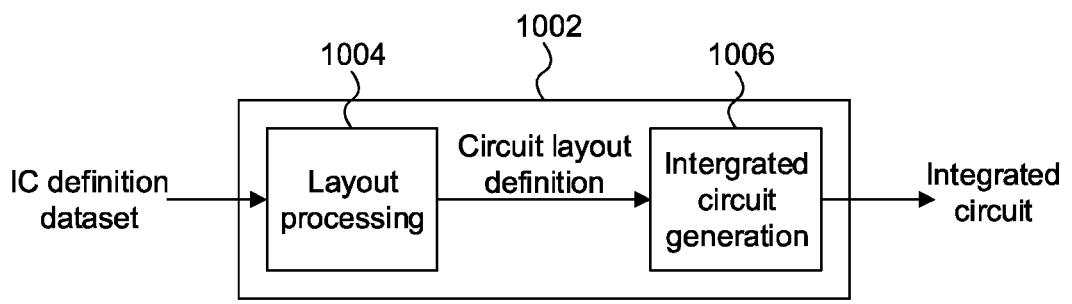
FIG. 10 shows an integrated circuit manufacturing system for generating an integrated circuit embodying a graphics processing system.

FIG. 10 shows an example of an integrated circuit (IC) manufacturing system 1002 which is configured to manufacture a coherency gathering system (or ray tracing system or graphics processing system) as described in any of the examples herein. In particular, the IC manufacturing system 1002 comprises a layout processing system 1004 and an integrated circuit generation system 1006. The IC manufacturing system 1002 is configured to receive an IC definition dataset (e.g. defining a coherency gathering system as described in any of the examples herein), process the IC definition dataset, and generate an IC according to the IC definition dataset (e.g. which embodies a coherency gathering system as described in any of the examples herein). The processing of the IC definition dataset configures the IC manufacturing system 1002 to manufacture an integrated circuit embodying a coherency gathering system (or ray tracing system or graphics processing system) as described in any of the examples herein.

The layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. A circuit layout definition may be, for example, a circuit layout description.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a coherency gathering system (or ray tracing system or graphics processing system) without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 10 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 10, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of coherency gathering for rays in a ray tracing system, the method comprising:
  defining a plurality of rays, each ray having associated with it ray information defining the ray;
  defining an acceleration structure comprising a plurality of nodes;
  wherein the nodes are instantiated within the acceleration structure in one or more instances, each instance associated with an instance transform specifying a relationship between the plurality of rays and a coordinate system for that instance;
  the method further comprising:
  gathering together a plurality of groups of rays, wherein each group requires intersection testing against one or more of the instances of a respective node in the acceleration structure;
  detecting that computational resources for performing the intersection testing are under-utilised;
  selecting one of the groups for intersection testing in response to said detecting; and
  submitting the selected group of rays for intersection testing,
  wherein said detecting that computational resources for performing the intersection testing are under-utilised comprises detecting that one or more of a box tester unit and a primitive tester unit has spare capacity to perform intersection testing.

2. The method of claim 1, wherein each node of the acceleration structure has geometry information associated with it, the method further comprising:
  storing the geometry information and the instance transforms in a memory;
  searching an instance transform cache for an instance transform of the instance against which the selected group requires testing;
  if the instance transform is found in the instance transform cache,
    submitting the selected group of rays for intersection testing, and
  if the instance transform is not found in the instance transform cache:
    retrieving the instance transform and loading it into the instance transform cache, and
  wherein:
  (A) retrieving the instance transform comprises requesting the instance transform from an acceleration structure cache; and/or
  (B) the method further comprises, before the step of submitting the selected group of rays for intersection testing, retrieving the geometry information of the selected node from a cache, wherein retrieving the geometry information optionally comprises requesting the geometry information from the acceleration structure cache.

3. The method of claim 2, wherein the acceleration structure cache retrieves from the memory any requested geometry information and/or instance transform that is not already stored in the acceleration structure cache, and returns the requested geometry information and/or instance transform.

4. The method of claim 1, wherein selecting said group of rays for intersection testing is based on one or more of the following criteria:
  detecting that the number of rays in the group exceeds a first predetermined threshold;
  detecting that the overall number of rays in all the groups exceeds a second predetermined threshold; and
  detecting that the number of rays that require testing against the respective node exceeds a third threshold.

5. The method of claim 1, further comprising:
 storing the instance transforms in a memory;
 searching an instance transform cache for an instance transform of the instance against which the selected group requires testing;
 if the instance transform is found in the instance transform cache,
  submitting the selected group of rays for intersection testing, and
 if the instance transform is not found in the instance transform cache:
  retrieving the instance transform and loading it into the instance transform cache;
 wherein when the instance transform is not found in the instance transform cache, retrieving the instance transform comprises:
  requesting the instance transform;
  monitoring whether the instance transform has been returned; and
  after detecting that the instance transform has been returned, proceeding to submit the selected group of rays for intersection testing.

6. The method of claim 5, wherein monitoring whether the instance transform has been returned comprises:
 upon requesting the instance transform, setting a flag bit associated with the instance transform; and
 upon receiving the returned instance transforming, clearing the flag bit.

7. The method of claim 1, wherein said selecting one of the groups for intersection testing is in response to detecting that one or more computational resources for performing the intersection testing is not performing intersection testing.

8. A non-transitory computer readable storage medium having stored thereon computer readable code configured to cause the method as set forth in claim 1 to be performed when the code is run on at least one processor.

9. A system for coherency gathering for rays in a ray tracing system, comprising:
 a ray store, configured to store ray information of a plurality of rays, the ray information for each ray defining the ray;
 a memory, configured to store:
  information associated with each of a plurality of nodes of an acceleration structure, wherein the nodes are instantiated within the acceleration structure in one or more instances, each instance associated with an instance transform specifying the relationship between the plurality of rays and a coordinate system for that instance,
  the memory being further configured to store the instance transforms; and
 a coherency gathering unit, configured to:
  gather together a plurality of groups of rays, wherein each group requires intersection testing against one or more of the instances of a respective node in the acceleration structure,
  detect that computational resources for performing the intersection testing are under-utilised;
  select one of the groups for intersection testing in response to said detecting, and
  submit the selected group of rays for intersection testing,
 wherein said detecting that computational resources for performing the intersection testing are under-utilised comprises detecting that one or more of a box tester unit and a primitive tester unit has spare capacity to perform intersection testing.

10. The system of claim 9, further comprising an instance transform unit, configured to transform ray information using an instance transform, and wherein the coherency gathering unit is configured to, when submitting the selected group of rays for intersection testing, submit the rays and the associated instance transform to the instance transform unit.

11. The system of claim 9, wherein the memory is configured to store geometry information associated with each of the plurality of nodes, the method further comprising an instance transform cache configured to temporarily store instance transforms, and wherein the coherency gathering unit is further configured to:
 search the instance transform cache for an instance transform of the instance against which the selected group requires testing;
 if the instance transform is found in the instance transform cache:
  submit the selected group of rays for intersection testing, and
 if the instance transform is not found in the instance transform cache:
  retrieve the instance transform and load it into the instance transform cache;
 the system further comprising at least one acceleration structure cache configured to temporarily store at least one of: the geometry information and the instance transforms, wherein the coherency gathering unit is configured:
 to retrieve the geometry information by requesting the geometry information from the at least one acceleration structure cache; and/or
 to retrieve the instance transform by requesting the instance transform from the at least one acceleration structure cache.

12. The system of claim 11, wherein the acceleration structure cache is configured to retrieve from the memory any requested geometry information and/or instance transform that is not already stored in the acceleration structure cache, and to return the requested geometry information and/or instance transform to the coherency gathering unit.

13. The system of claim 9, wherein the coherency gathering unit is configured to select said group of rays for intersection testing based on one or more of the following additional criteria:
 detecting that the number of rays in the group exceeds a first predetermined threshold;
 detecting that the overall number of rays in all the groups exceeds a second predetermined threshold; and
 detecting that the number of rays that require testing against the respective node exceeds a third threshold.

14. The system of claim 9, further comprising an instance transform cache configured to temporarily store instance transforms, and wherein the coherency gathering unit is further configured to:
 search the instance transform cache for an instance transform of the instance against which the selected group requires testing;
 if the instance transform is found in the instance transform cache:
  submit the selected group of rays for intersection testing, and
 if the instance transform is not found in the instance transform cache:
  retrieve the instance transform and load it into the instance transform cache;

wherein, when the instance transform is not found in the instance transform cache, the coherency gathering unit is configured to retrieve the instance transform by:
requesting the instance transform;
monitoring whether the instance transform has been returned; and
after detecting that the instance transform has been returned, proceeding to submit the selected group of rays for intersection testing.

15. The system of claim 9, further comprising an instance transform cache configured to temporarily store instance transforms, wherein the instance transform cache comprises a content addressable memory (CAM), and a random access memory (RAM), and wherein the CAM is configured to store, for each of a plurality of instance transforms, the memory address of the instance transform at a respective index location in the CAM, and the RAM is configured to store, for each of the plurality of instance transforms, the transform coefficients of that instance transform at a corresponding index location in the RAM,
whereby, when the CAM is queried with a memory address of an instance transform, it returns the index of the location in the RAM where the respective transform coefficients are stored.

16. The system of claim 9, further comprising an instance transform cache configured to temporarily store instance transforms, wherein the instance transform cache comprises a content addressable memory (CAM), and a random access memory (RAM), and wherein the CAM is configured to store, for each instance transform, a reference counter that records the number of groups of rays currently being tested that reference that instance transform.

17. The system of claim 9, further comprising an instance transform cache configured to temporarily store instance transforms, wherein the instance transform cache comprises a content addressable memory (CAM), and a random access memory (RAM), and wherein the CAM is configured to store, for each instance transform in the instance transform cache, a validity flag that indicates whether that instance transform is currently valid.

18. A graphics processing system comprising the system for coherency gathering as set forth in claim 9.

19. An integrated circuit manufacturing system comprising:
a non-transitory computer readable storage medium having stored thereon a computer readable dataset description of a graphics processing system as set forth in claim 18;
a layout processing system configured to process the computer readable description so as to generate a circuit layout description of an integrated circuit embodying the graphics processing system; and
an integrated circuit generation system configured to manufacture the graphics processing system according to the circuit layout description.

20. A method of manufacturing, using an integrated circuit manufacturing system, a system as set forth in claim 9, the method comprising:
processing, using a layout processing system, a computer readable description of the system as set forth in claim 9 so as to generate a circuit layout description of an integrated circuit embodying the system as set forth in claim 9; and
manufacturing, using an integrated circuit generation system, the system of claim 9 according to the circuit layout description.

* * * * *